No. 770,364.
PATENTED SEPT. 20, 1904.
G. HACKER.
FOOD RECEPTACLE.
APPLICATION FILED FEB. 8, 1904.
NO MODEL.
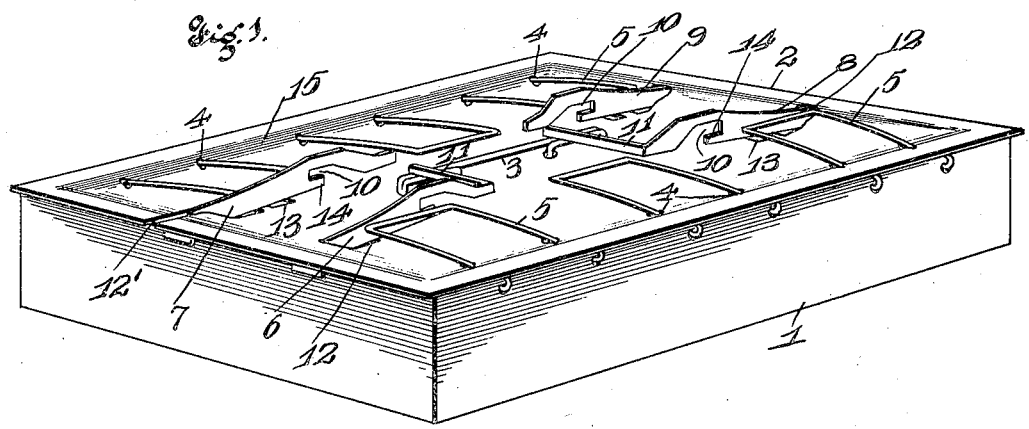
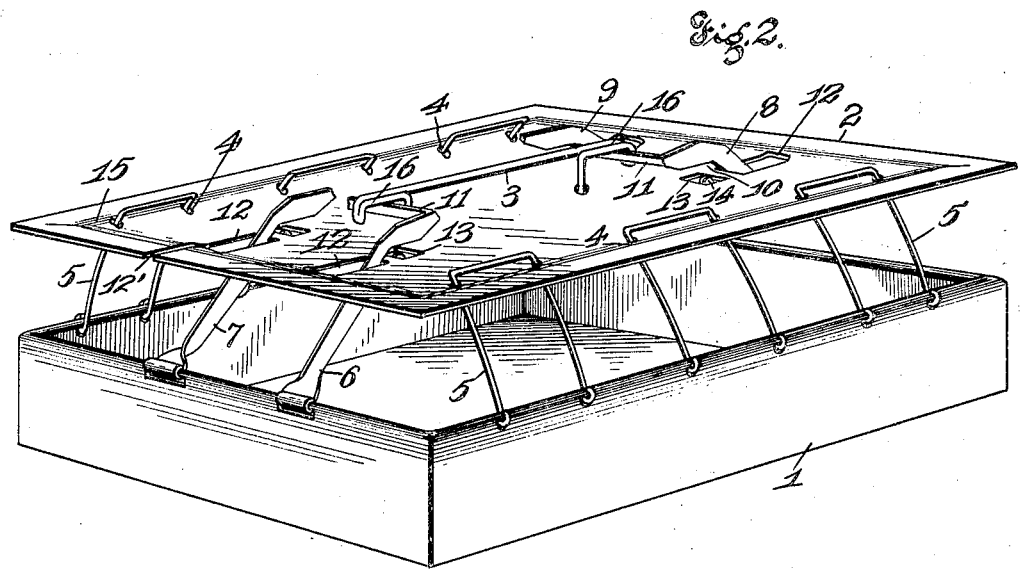
Witnesses
Alfred A. Eicks
M. A. Drion
Inventor
George Hacker
By Higdon & Longan & Hopkins Attys No. 770,364. Patented September 20, 1904.

UNITED STATES PATENT OFFICE.

GEORGE HACKER, OF ST. LOUIS, MISSOURI.

FOOD-RECEPTACLE.

SPECIFICATION forming part of Letters Patent No. 770,364, dated September 20, 1904.

Application filed February 8, 1904. Serial No. 192,562. (No model.)

*To all whom it may concern:*

Be it known that I, GEORGE HACKER, a citizen of the United States, residing at St. Louis, State of Missouri, have invented certain new and useful Improvements in Food-Receptacles, of which the following is a specification containing a full, clear, and exact description, reference being had to the accompanying drawings, forming a part hereof.

My invention relates to an improved food-receptacle, and has for its object to provide a readily-portable receptacle having a cover, which cover is so connected to the receptacle that it may be elevated and held in place above the level of the top of the receptacle, the connecting means between the cover and the receptacle serving as slats to permit poultry or other fowls to have access to the contents of the receptacle, while preventing them from getting into the food.

In the drawings, Figure 1 is a perspective view of my receptacle when the cover is depressed. Fig. 2 is a perspective view of the same when the cover is elevated and locked in position.

In the drawings the receptacle is indicated by the numeral 1, and the cover by the numeral 2. The cover is provided with the handle 3. About its edges the cover 2 is provided with openings 4. The bars 5 are pivotally connected to the receptacle 1, a single wire serving to form two of the said bars 5, as shown in the drawings, the said wires projecting through the openings 4 in such a manner that when the cover 2 is uplifted from the receptacle 1 the bars 5 will be drawn into an approximately vertical position, where they will serve as slats to keep poultry and the like from getting into the receptacle 1 and soiling its contents with their feet. Upon two sides of the receptacle 1 I have provided the arms 6, 7, 8, and 9, each of said arms being provided with the slot 10 and prong 14 and the arms 6 and 8 being angulated at their upper extremities to form the stops 11, which stops 11 serve to control and limit the upward movement of the cover 2. The arms 6, 7, 8, and 9 extend through the slots 12 in the cover 2, the cover 2 being provided with the slots 13, which are adapted to receive the prongs 14, whereby the cover 2 is caught and held in an elevated position away from the top of the receptacle 1.

The mode of operation of my device is as follows: It is intended for use in feeding soft foods or grain to poultry, pigeons, and the like, in which use it is highly desirable to provide a receptacle from which the fowls may readily feed, but which they cannot enter, as by such entry dirt is conveyed to the contents of the receptacle, which contents are thereby rendered unfit for use and largely wasted. Furthermore, in the use of open receptacles the stronger fowls take possession of the food and drive the weaker ones away, so that some fowls will be overfed, while others are underfed.

In the use of my invention the food is placed in the receptacle 1 through the opening which is formed by withdrawing the arm 7 from the slot 12 through the smaller slot 12'. The arm 7 is then replaced in the slot 12 and the cover is lowered to its seat upon the top of the receptacle 1. The arms 6, 7, 8, and 9 and the bars 5 are then folded in approximately a horizontal position on top of the cover 2, which is provided for that purpose with the flange 15 about its outer edges. The closed receptacle is then practically flat upon its top, and any number of such receptacles so filled may be stacked one upon the other for distribution to the poultry-pens. When a pan is placed in position in the pen, the cover 2 is raised by means of the handle 3 until its forward movement is checked by the stops 11, when the handle being released and the arms 6, 7, 8, and 9 being inclined inwardly by means of their own weight their prongs 14 engage in the slots 13 to catch and hold the cover 2 in position.

When it is desired to remove the receptacle, the cover is again disengaged from the prongs 14 by being slightly lifted and then quickly dropped, so that the prongs 14 will not engage with the slots 13, such engagement only being effected when the cover is gradually lowered, so as to give the arms 6, 7, 8, and 9 time to move inwardly, carrying their prongs 14 into a position to engage with the slots 13.

In order to secure the cover 2 in its elevated position when raised, I have provided the extremities of the handle 3 with the hooks 16, which are adapted to catch and hold the stops 11 and prevent their accidental displacement.

I claim—

1. An improved food-receptacle, comprising a suitable vessel, a cover, bars pivotally fixed upon two opposite edges of the vessel and extending through apertures in the cover, and slotted arms pivotally fixed upon two other edges, the slotted arms and bars serving to prevent poultry from entering the receptacle when the cover is raised above the level of the vessel, the bars and slotted arms being folded closely upon the top of the cover when the cover is at the level of the top of the vessel, substantially as described.

2. The improved food-receptacle, comprising a vessel, a cover, a plurality of slotted arms pivotally mounted upon the upper edge of the vessel and extending through slots in the cover, the slotted arms serving to hold the cover above the level of the top of the vessel when elevated and being folded over upon the top of the cover when the same is depressed, substantially as described.

3. The improved food-receptacle comprising a vessel, a cover, a plurality of slotted arms pivotally mounted upon the upper edge of the vessel and extending through slots in the cover, the slotted arms serving to hold the cover above the level of the top of the vessel when elevated, the slotted arms being pivotally mounted on the vessel and being folded over upon the top of the cover when the same is depressed, and bars pivotally mounted on the vessel and extending through openings in the cover, substantially as described.

4. An improved food-receptacle, comprising a suitable vessel, a cover, slotted arms and folding bars whereby the cover is so connected to the receptacle that it can be uplifted and held in position away from the mouth of the receptacle, when the bars and slotted arms will serve as slats to prevent the entry of fowls to the receptacle, substantially as described.

5. An improved food-receptacle, comprising a suitable vessel, a cover, folding bars and slotted arms whereby the cover is connected to the receptacle so that it can be uplifted and held in position away from the mouth of the receptacle, when the bars and slotted arms will serve as slats to prevent the entry of fowls to the receptacle, and means for locking the cover in its elevated position, substantially as described.

In testimony whereof I have signed my name to this specification in presence of two subscribing witnesses.

GEORGE HACKER.

Witnesses:
M. G. IRION,
ALFRED A. EICKS.